United States Patent
Hirano (10) Patent No.: US 8,299,765 B2
(45) Date of Patent: Oct. 30, 2012

(54) POWER SUPPLY CONTROL DEVICE AND POWER SUPPLY CONTROL METHOD

(75) Inventor: Takeshi Hirano, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 432 days.

(21) Appl. No.: 12/369,954

(22) Filed: Feb. 12, 2009

(65) Prior Publication Data

US 2009/0219004 A1    Sep. 3, 2009

(30) Foreign Application Priority Data

Feb. 28, 2008  (JP) ................................. 2008-047075

(51) Int. Cl.
*G05F 1/575* (2006.01)
*G05F 1/563* (2006.01)

(52) U.S. Cl. ......... 323/266; 323/224; 323/901; 323/908

(58) Field of Classification Search .................. 323/266, 323/268, 270, 271, 901, 908, 224; 363/49
See application file for complete search history.

(56) References Cited

U.S. PATENT DOCUMENTS

| 5,216,351 | A | * | 6/1993 | Shimoda | 323/224 |
| 5,233,508 | A | | 8/1993 | Yamamura et al. | |
| 6,937,487 | B1 | * | 8/2005 | Bron | 363/60 |
| 7,098,633 | B1 | * | 8/2006 | Brokaw et al. | 323/222 |
| 7,688,047 | B2 | * | 3/2010 | Sugiyama et al. | 323/268 |
| RE41,304 | E | * | 5/2010 | Matsuo et al. | 323/266 |

FOREIGN PATENT DOCUMENTS

JP    05-76167 A    3/1993

* cited by examiner

*Primary Examiner* — Gary L Laxton
(74) *Attorney, Agent, or Firm* — Arent Fox LLP (57) ABSTRACT

A power supply control device includes a boost type power supply controller boosting an input voltage, a step down power supply controller reducing an output of the boost type power supply controller to output an output voltage, a first control loop including the boost type power supply controller, and a second control loop including the step down power supply controller, wherein the output voltage is controlled by the second control loop during a predetermined period beginning after the power supply control device enters a power-on state, and wherein the output voltage is controlled by the first control loop after the predetermined period passes.

11 Claims, 11 Drawing Sheets

POWER SUPPLY CONTROL DEVICE AND POWER SUPPLY CONTROL METHOD

CROSS-REFERENCE TO RELATED APPLICATIONS

This application claims the benefit of priority of Japanese Patent Application No. 2008-047075 filed on Feb. 28, 2008, the entire contents of which are incorporated herein by reference.

FIELD

The present application relates to a power supply control device and a power supply control method.

BACKGROUND

Figure 1:
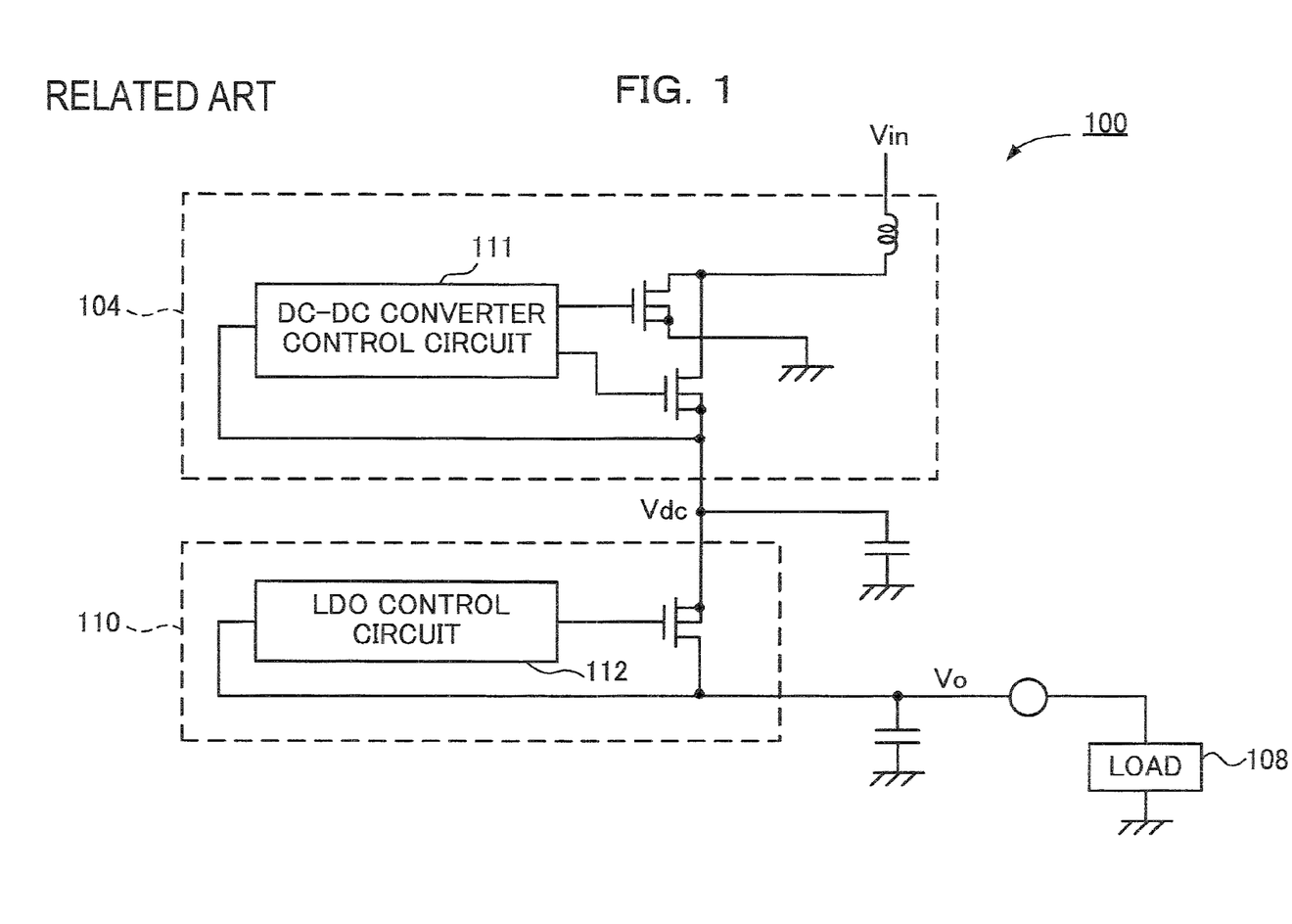
FIG. 1 illustrates a typical power supply control device.

FIG. 1 illustrates a power supply control device 100 of a double conversion system. The power supply control device 100 includes a DC-DC converter 104 and an LDO (low drop regulator) 110. The respective DC-DC converter 104 and the LDO 110 are controlled independently. The DC-DC converter 104 is controlled by a DC-DC converter control circuit 111. The LDO 110 is controlled by an LDO control circuit 112. An output voltage Vdc is output by a boost control of the boost DC-DC converter 104 responsive to an input voltage Vin. An output voltage Vo is output by a reduction control of the LDO 110 responsive to the output voltage Vdc. The output voltage Vo is supplied to a load 108.

Figure 2:
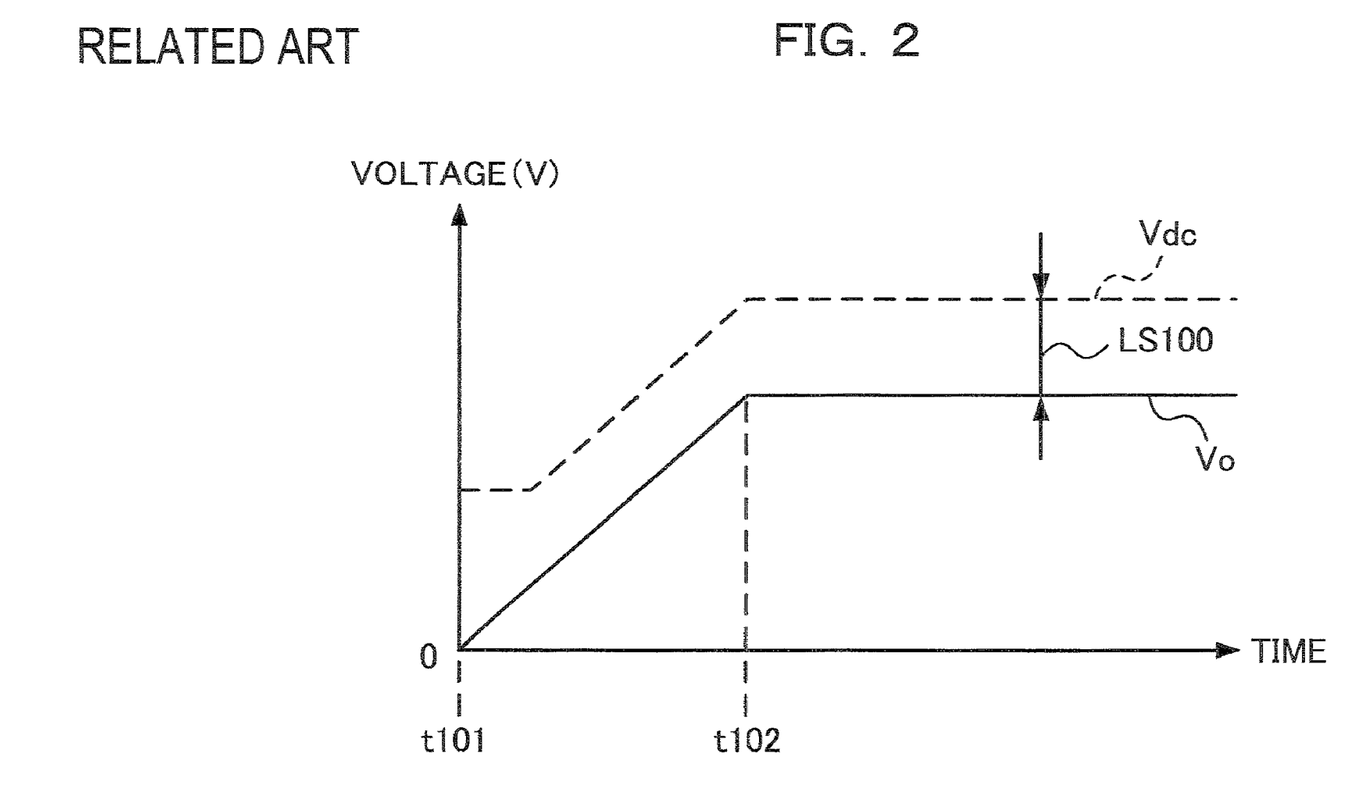
FIG. 2 illustrates an output voltage of the typical power supply control device of FIG. 1.

As shown in FIG. 2, the output voltage Vo is 0 V at a time t101 during standby. A load current does not flow through the load 108 during standby. The output voltage Vo gradually rises during a start up period from the time t101 to a time t102. This prevents an inrush current from flowing through the load 108.

As further shown in FIG. 2, a value of the output voltage Vdc is set to be greater than that of the output voltage Vo by a predetermined voltage or more because the LDO 110 in FIG. 1 is a low drop regulator. The value of the output voltage Vdc is set to be sufficiently large so that a maximum load current is supplied in the case where the load 108 is a maximum load. A difference between the output voltages Vdc and Vo is a loss LS100, which results in a reduction of efficiency of the power supply control device 100.

SUMMARY

According to aspects of the embodiments, a power supply control device includes a boost type power supply controller boosting an input voltage, a step down power supply controller reducing an output of the boost type power supply controller to output an output voltage, and a first control loop including the boost type power supply controller and a second control loop including the step down power supply controller, wherein the output voltage is controlled by the second control loop during a predetermined period from power on, wherein the output voltage is controlled by the first control loop after the predetermined period passes.

DETAILED DESCRIPTION OF THE EMBODIMENTS

In the following descriptions, many of the exemplary circuits are shown to include n-channel metal-oxide-semiconductor field-effect transistors (MOSFETs) in a variety of configurations. While MOSFET devices are used by example, the disclosed circuits may be implemented using any number of other transistor types, such as J-FETs, bipolar transistors, and so on. Additionally, while n-channel devices are used in the following examples, the same general approaches may also apply to circuits incorporating p-channel FETs or PNP bipolar transistors, for example.

Still further, while terms "drain" and "source" are used for ease of explanation and to adhere to traditional engineering usage, it should be recognized that a drain and source of a FET transistor may be considered interchangeable, and for the following descriptions merely thought of as a first end and a second end of a semiconductor channel unless otherwise stated or apparent to one of ordinary skill in the art.

Figure 3:
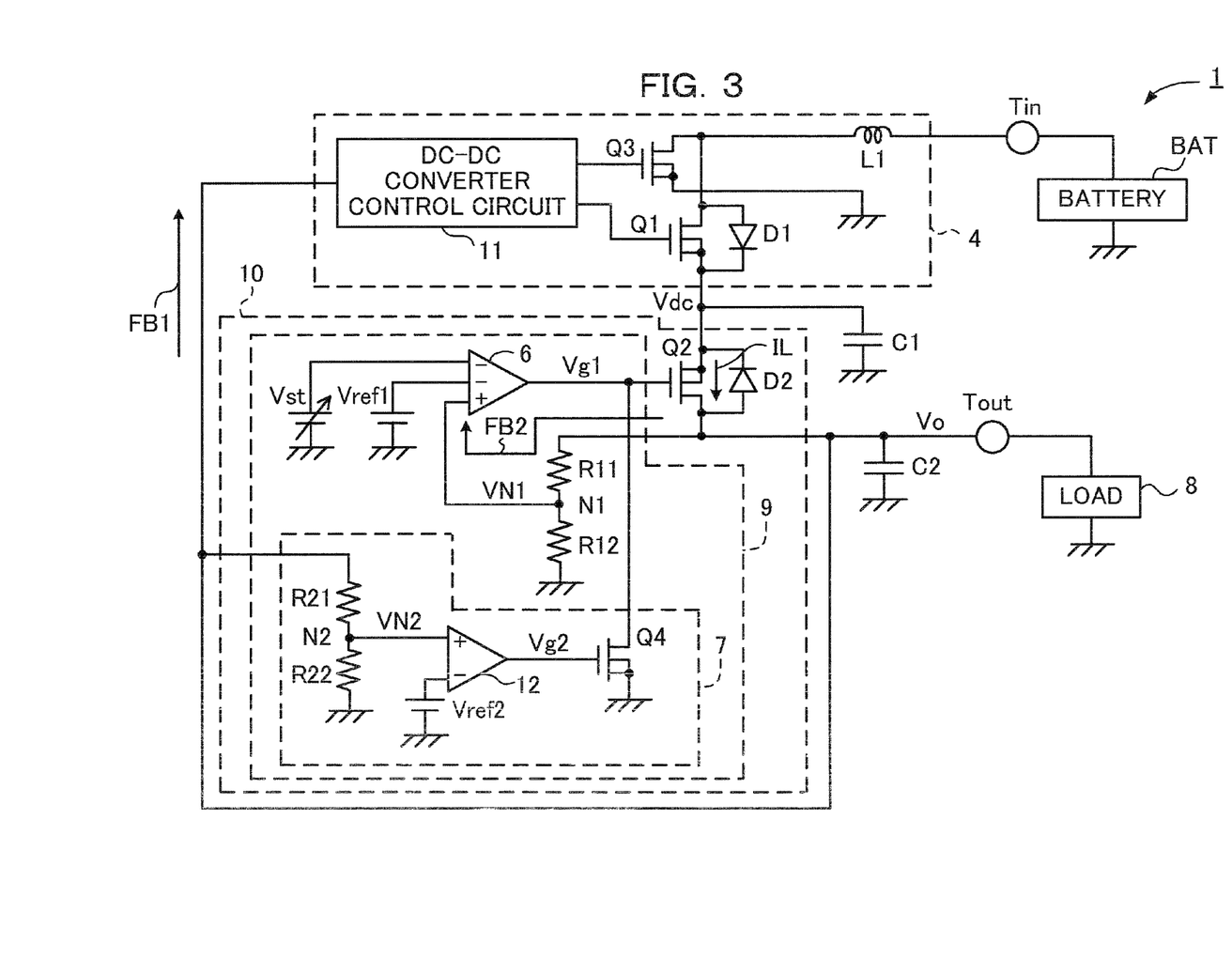
FIG. 3 illustrates a first embodiment.

FIG. 3 illustrates a first embodiment. As shown in FIG. 3, a power supply control device 1 includes a boost DC-DC converter 4, an LDO 10, an output capacitor C1, an output capacitor C2, an input terminal Tin and an output terminal Tout. The input voltage Vin is applied by coupling, for example, a battery BAT to the input terminal Tin. A load 8 is coupled to the output terminal Tout. The regulated output voltage Vo is output to a set voltage Vset (3.3 V).

As further shown in FIG. 3, the DC-DC converter 4 includes a transistor Q1 for rectification, a transistor Q3 for switching, a DC-DC converter control circuit 11, and a coil L1. The input terminal Tin is coupled to one end of the coil L1. Input voltage Vin is applied at the input terminal Tin. Drain terminals of the transistors Q1 and Q3 are coupled to the other end of the coil L1. Gate terminals of the transistors Q1 and Q3 are coupled to the DC-DC converter control circuit 11. The output voltage Vdc is output by coupling a source terminal of the transistor Q1 to the output capacitor C1. The source terminal of the transistor Q1 is coupled to the LDO 10. A body diode D1 is coupled to the transistor Q1 in a forward direction from an input terminal Tin side to an output terminal Tout side. A source terminal of the transistor Q3 is grounded. The output voltage Vo is fed back to the DC-DC converter control circuit 11 by a feedback loop FB1. Since the DC-DC converter control circuit 11 is a control circuit for performing a general boost operation, the detailed description regarding its circuit configuration is omitted.

As further shown in FIG. 3, the LDO 10 includes a transistor Q2 for an output switch and a controller 9. The output voltage Vdc is applied to a source terminal of the transistor Q2 and the output voltage Vo is output from a drain terminal thereof. A load current IL flows through the transistor Q2. A body diode D2 is coupled to the transistor Q2 in a forward direction to a direction from the output terminal side Tout to the input terminal side Tin.

As further shown in FIG. 3, the controller 9 includes an amplifier 6, a resistance element R11, a resistance element R12, a reference voltage Vref1, a soft start voltage Vst and a logic circuit 7. The output voltage Vo is applied to one end of the resistance element R11. The other end of the resistance element R11 is coupled to one end of the resistance element R12 through a node N11, and the other end of the resistance element R12 is grounded. The resistance elements R11 and R12 are configured to divide the output voltage Vo. The resistance elements R11 and R12 are set so that a divided voltage VN1 becomes similar to the reference voltage Vref1 in the case where the output voltage Vo is the set voltage Vset (for example, 3.3 V). The amplifier 6 is a voltage amplifier having two inversion inputs and one non-inversion input. The node N1 is coupled to the non-inversion input of the amplifier 6. The reference voltage Vref1 is applied to one inversion input of the amplifier 6 and the soft start voltage Vst is applied to the other inversion input. Priority is given to a lower input of the two inversion inputs of the amplifier 6 so that the amplifier 6 performs an operation amplifying a difference between a voltage of the lower input of the two inversion inputs and the divided voltage VN1. A gate voltage Vg1 output from the amplifier 6 is applied to a gate of the transistor Q2. The output voltage Vo is fed back to the amplifier 6 by a feedback loop FB2.

As further shown in FIG. 3, the logic circuit 7 includes a transistor Q4 for switching, a comparator 12, a resistance element R21, a resistance element R22 and a reference voltage Vref2 The output voltage Vo is applied to one end of the resistance element R21, and one end of the resistance element R22 is coupled to the other end of the resistance element R21 through a node N2. The other end of the resistance element R22 is grounded. The resistance elements R21 and R22 are configured to divide the output voltage Vo. The resistance elements R21 and R22 are set so that a divided voltage VN2 becomes similar to the reference voltage Vref2 in the case where the output voltage Vo is the set voltage Vset (for example, 3.3 V). The divided voltage VN2 is applied to a non-inversion input of the comparator 12 and the reference voltage Vref2 is applied to an inversion input thereof. A gate voltage Vg2 output from the comparator 12 is applied to a gate of the transistor Q4. A source terminal of the transistor Q4 is grounded and a drain terminal thereof is coupled to the gate of the transistor Q2.

Figure 4:
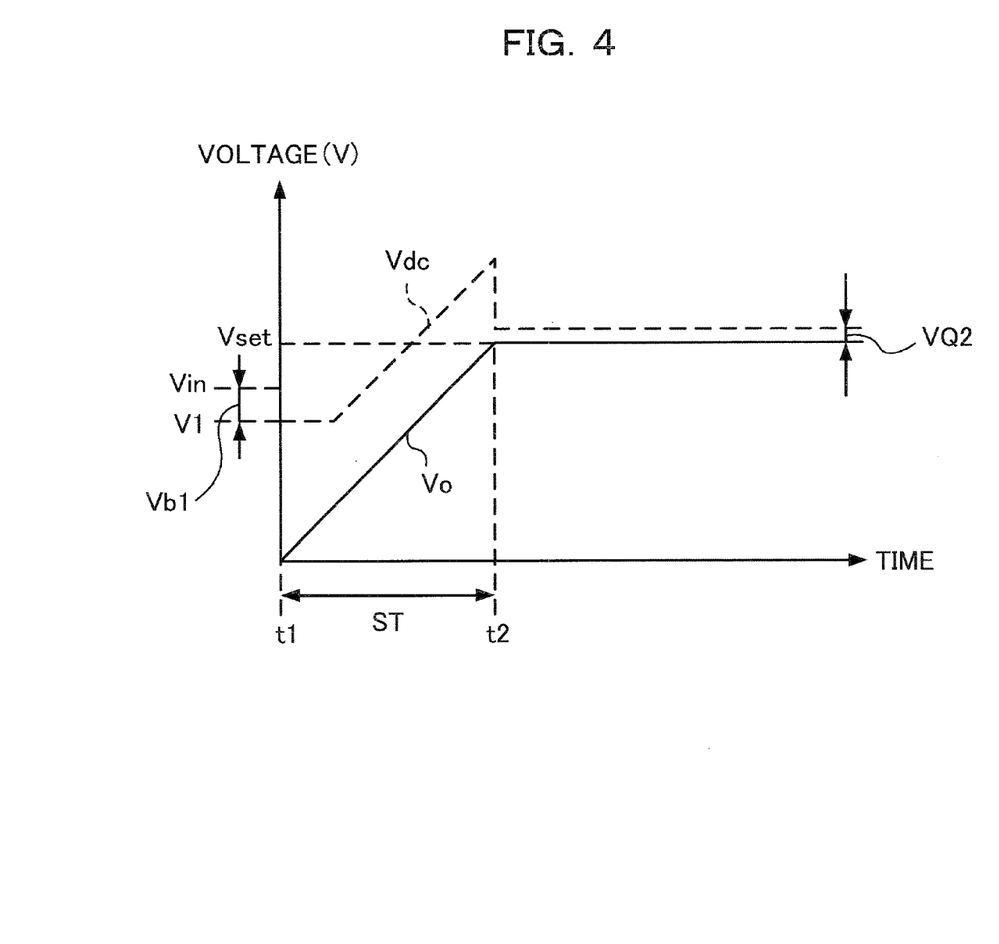
FIG. 4 illustrates output voltages of the first embodiment in FIG. 3.

FIG. 4 illustrates the output voltages of the first embodiment in FIG. 3. An operation of the power supply control device 1 in FIG. 3 is described based on FIG. 4.

An operation during standby at a time t1 is shown in FIG. 4. The transistors Q1 through Q4 in FIG. 3 are in an off state during standby. A value of the output voltage Vdc of the DC-DC converter 4 in FIG. 3 does not become, for example, 0 V because a forward bias voltage is applied to the body diode D1 of the transistor Q1 in FIG. 3. In this case, the value of the output voltage Vdc is a voltage V1 decreasing from the input voltage Vin by a voltage drop Vb1 of the body diode D1 of the transistor Q1 in FIG. 3. Since a reverse bias voltage is applied to the body diode D2 of the transistor Q2 in FIG. 3, a dark current flow is prevented so that a value of the output voltage Vo becomes, for example, 0 V. In this manner, the transistor Q2 of the LDO 10 in FIG. 3 prevents a load current from flowing through the load 8 during standby.

An operation during a start up period ST from the time t1 to a time t2 is also shown in FIG. 4. The soft start voltage Vst gradually increases, for example, from 0 V during the start up period ST. The output voltage Vo fed back by the feedback loop FB2 is compared with the soft start voltage Vst at the amplifier 6 in FIG. 3. The gate voltage Vg1 gradually decreases by the comparison operation as the soft start voltage Vst increases. An on-resistance of the transistor Q2 in FIG. 3 gradually decreases in response to the decrease of the gate voltage Vg1 so that the output voltage Vo gradually increases, for example, from 0 V. If the soft start voltage Vst becomes greater than the reference voltage Vref1, the output voltage Vo is regulated to the set voltage Vset by the reference voltage Vref1 so that the increase of the output voltage Vo ends. According to the above control, the LDO 10 in FIG. 3 performs a soft start in which the output voltage Vo gradually increases, for example, from 0 V to the set voltage Vset during the start up period ST. An inrush current is prevented from flowing through the load 8 during the start up.

As further shown in FIG. 4, an operation after the start up from the time t2 is shown. In case that the output voltage Vo reaches the set voltage Vset at the time t2, the gate voltage Vg2 output from the comparator 12 in FIG. 3 is inverted from a low level to a high level. It is detected that the start up of the power supply control device 1 in FIG. 3 has been completed by the operation of the comparator 12 in FIG. 3. The high level gate voltage Vg2 turns on the transistor Q4 in FIG. 3 and reduces the gate voltage Vg1 to a ground voltage. When the gate voltage Vg1 is reduced to the ground voltage, the transistor Q2 in FIG. 3 is kept in a full-on state and a saturation region. The LDO 10 stops to function as a low drop regulator in this state. A resistance element having a minimum on-resistance value of the transistor Q2 in FIG. 3 is equivalent to a circuit configuration coupled between an output terminal of the DC-DC converter 4 in FIG. 3 and the output terminal Tout. The above control switches a circuit for controlling the output voltage Vo from the LDO 10 in FIG. 3 to the DC-DC converter 4 in FIG. 3 in response to a passage of the start up period ST. That is, a loop for controlling the output voltage Vo is switched from the feedback loop FB2 to the feedback loop FB1 in response to the passage of the start up period ST.

As further shown in FIG. 4, after the start up period ST passes, the output voltage Vo is monitored at the DC-DC converter 4 in FIG. 3 and regulated to the set voltage Vset by the DC-DC converter 4 in FIG. 3. A value of the output voltage Vdc is obtained by adding a voltage VQ2, or a voltage drop of the transistor Q2 to the output voltage Vo.

Figure 5:
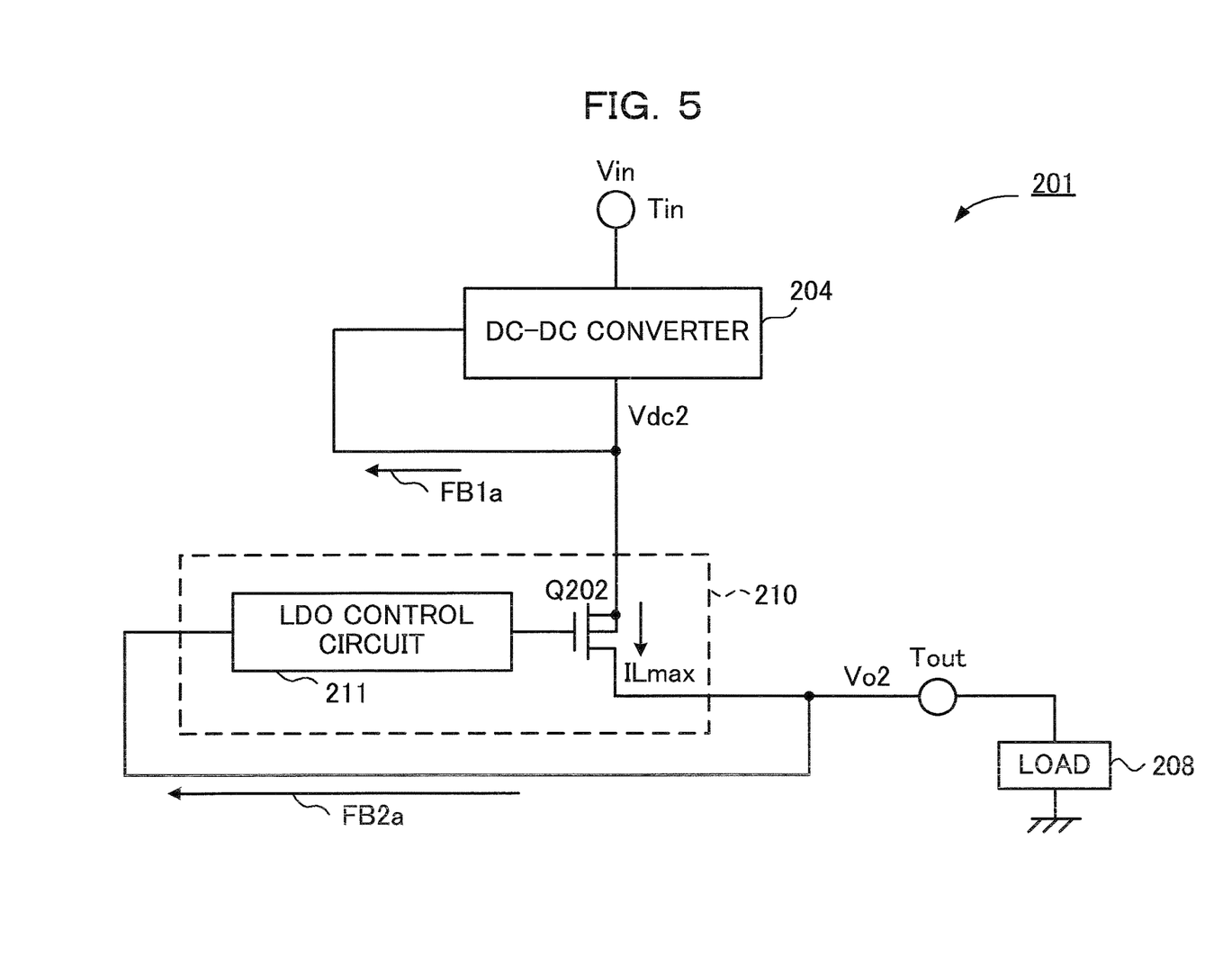
FIG. 5 illustrates a power supply control device 201.

A power supply control device 201 shown in FIG. 5 is described as a comparison. The power supply control device 201 uses both a DC-DC converter 204 and an LDO 210 for controlling an output voltage Vo2. An output voltage Vdc2 is fed back to the DC-DC converter 204 by a feedback loop FB1a. The output voltage Vo2 is fed back to an LDO control circuit 211 of the LDO 210 by a feedback loop FB2a. The DC-DC converter 204 monitors the output voltage Vdc2 and boosts an input voltage Vin. The output voltage Vdc2 regulated to a set voltage Vset2 is output from the DC-DC converter 204. The LDO control circuit 211 controls an on-resistance value of a transistor Q202 according to a monitoring result of the output voltage Vo2. In the LDO 210, the output voltage Vdc2 is reduced and the output voltage Vo2 regulated to the set voltage Vset2 is output.

An operation of the power supply control device 201 is described. The output voltage Vdc2 of the DC-DC converter 204 is an input voltage of the LDO 210. A value of the output voltage Vdc2 is set to be greater than that of the output voltage Vo2 because the LDO 210 is a low drop regulator. The value of the output voltage Vdc2 is set to be an efficiently large kept value such that a maximum load current ILmax is supplied in the case where a load 208 is a maximum load. The output voltage Vdc2 is expressed by a following formula (1).

$$Vdc2 = Vo2 + (\text{an on-resistance of the transistor } Q202 \times \text{the maximum load current } IL\text{max}) \quad \text{formula (1)}$$

Figure 6:
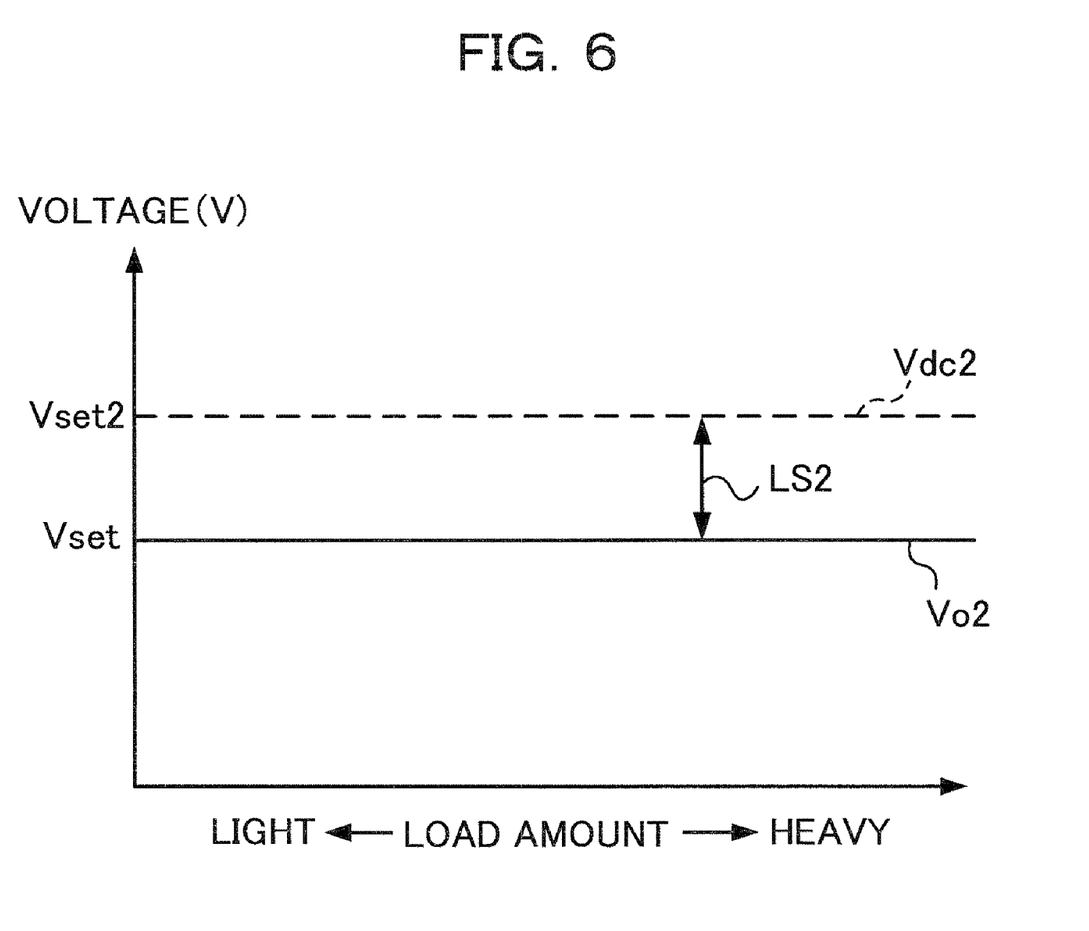
FIG. 6 illustrates a first example of output voltages of the power supply control device 201 in FIG. 4.

Specifically, as shown in FIG. 6, the value of the output voltage Vdc2 is a constant value determined by the formula (1) regardless of being light or heavy of a load amount of the load 208 in FIG. 5. A loss LS2 of the transistor Q202 in FIG. 5 is constant regardless of the load amount because a voltage drop from the output voltage Vdc2 to the output voltage Vo2 is a loss.

Figure 7:
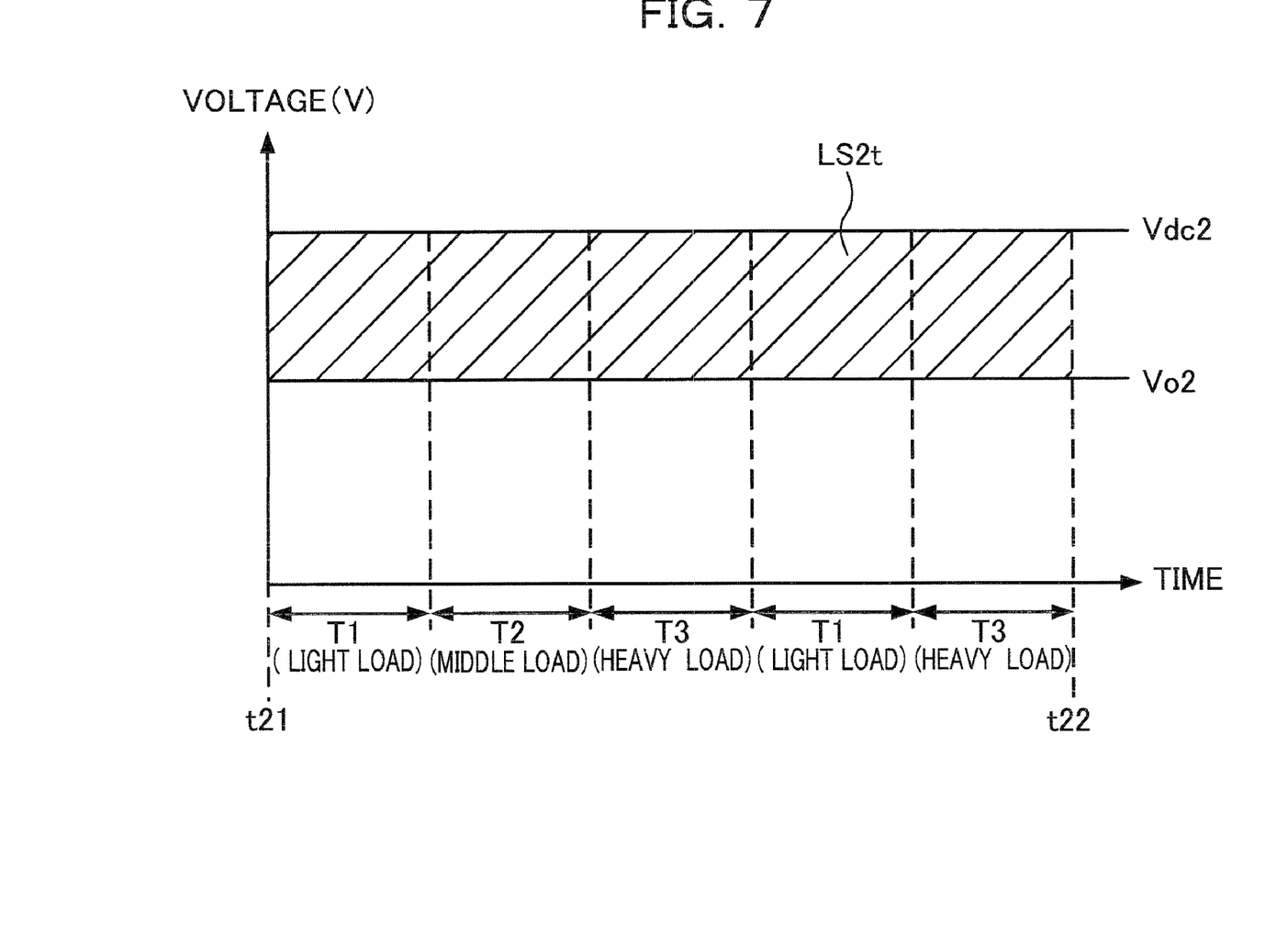
FIG. 7 illustrates a second example of the output voltages of the power supply control device 201 in FIG. 4.

In FIG. 7, a loss LS2t at the transistor Q202 in FIG. 5 is shown in the case where the load amount of the load 208 in FIG. 5 varies according to a time passage. In FIG. 7, a period T1 with the load amount in a light load state, a period T2 with the load amount in a middle load state, and a period T3 with the load amount in a heavy load state change their places according to the time passage. The loss LS2t from times t21 to t22 is expressed by a diagonally shaded area in FIG. 7. The loss LS2t is constant regardless of the load amount.

In the first embodiment in FIG. 3, the LDO 10 controls the output voltage Vo during the start up period ST from a power on to completion of the start up. The LDO 10 controls the output voltage Vo in any aspect during the start up period ST. Accordingly, the LDO 10 performs a soft start control for gradually raising the output voltage Vo, for example, from 0 V to the set voltage Vset.

Further, in the first embodiment in FIG. 3, the feedback loop FB1 of the DC-DC converter 4 monitors the output voltage Vo and controls the output voltage Vdc after the start up period ST passes. A circuit for controlling the output voltage Vo is switched from the LDO 10 to the DC-DC converter 4 before the start up period ST and after the start up period ST. Like the power supply control device 201 in FIG. 5, both of the DC-DC converter 4 and the LDO 10 may not be used when the output voltage Vo is controlled. Thus, a value of the output voltage Vdc may not be set at a sufficiently large kept value such that the maximum load current ILmax is supplied in the case where the load 8 is a maximum load. The value of the output voltage Vdc is variably controlled depending on the load amount. In this case, the output voltage Vdc is expressed by a following formula (2).

$$Vdc = Vo + (\text{the on-resistance of the transistor } Q2 \times \text{the load current } IL) \quad \text{formula (2)}$$

Figure 8:
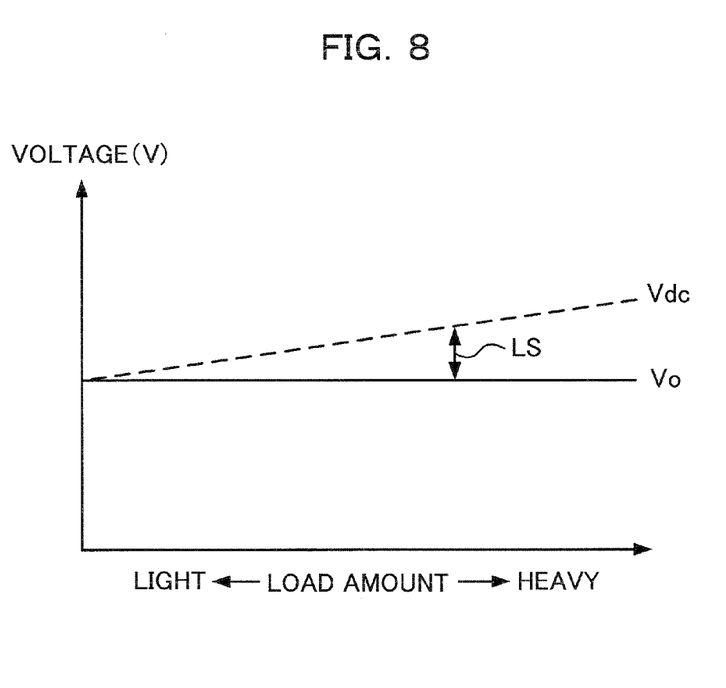
FIG. 8 illustrates a first example of the output voltages of the first embodiment.

As shown in FIG. 8, a small load current IL causes a voltage drop amount of the transistor Q2 in FIG. 3 to be small in the case of a light load amount so that the output voltage Vdc becomes small. On the other hand, a large load current IL causes the voltage drop amount of the transistor Q2 in FIG. 3 to be large in the case of a heavy load amount so that the output voltage Vdc becomes large. Accordingly, the loss LS at the transistor Q2 in FIG. 3 is reduced as the load amount of the load 8 in FIG. 3 becomes smaller.

Figure 9:
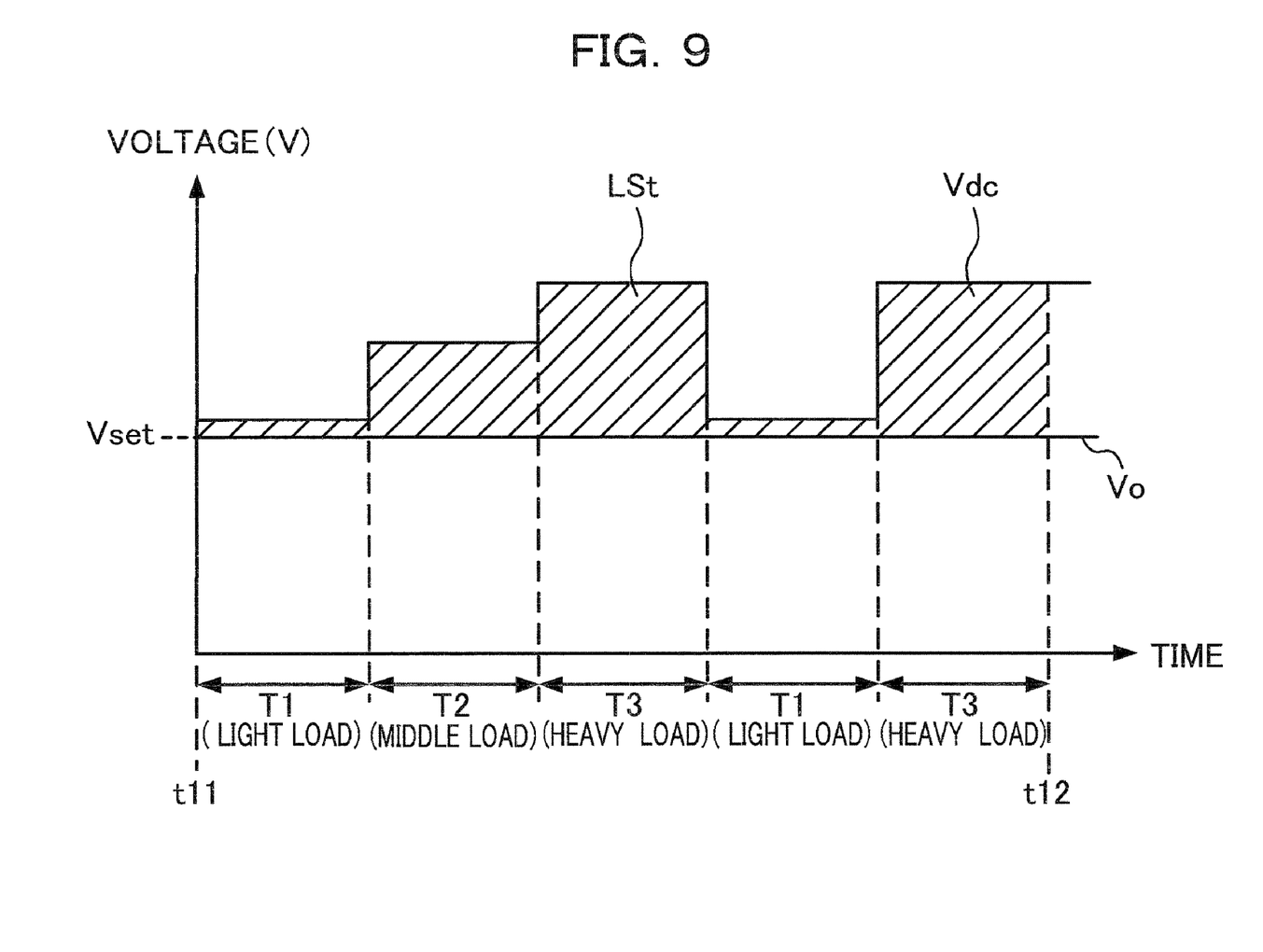
FIG. 9 illustrates a second example of the output voltages of the first embodiment.

FIG. 9 illustrates a loss LSt at the transistor Q2 in FIG. 3 in the case where the load amount of the load 8 in FIG. 3 varies according to the time passage. Similarly to FIG. 7, the periods T1 to T3 change their places according to the time passage in FIG. 9. The loss LSt from times t11 to t12 is expressed by a diagonally shaded area in FIG. 9.

As shown in FIG. 9, the loss LSt is reduced as the load amount becomes lighter. The loss LSt of the power supply control device 1 in FIG. 3 is reduced compared with the loss LS2t (FIG. 7) of the power supply control device 201. Because of this, efficiency of the power supply control device 1 in FIG. 3 is improved.

If the transistor Q2 in FIG. 3 is kept in a full-on state and used in a saturation region, a low-pass filter is formed by a resistance element having the minimum on-resistance of the transistor Q2 in FIG. 3 and the output capacitor C2. The low-pass filter is coupled to an output of the boost DC-DC converter 4 in FIG. 3, and therefore, a ripple property of the output voltage Vo becomes suitable.

Figure 10:
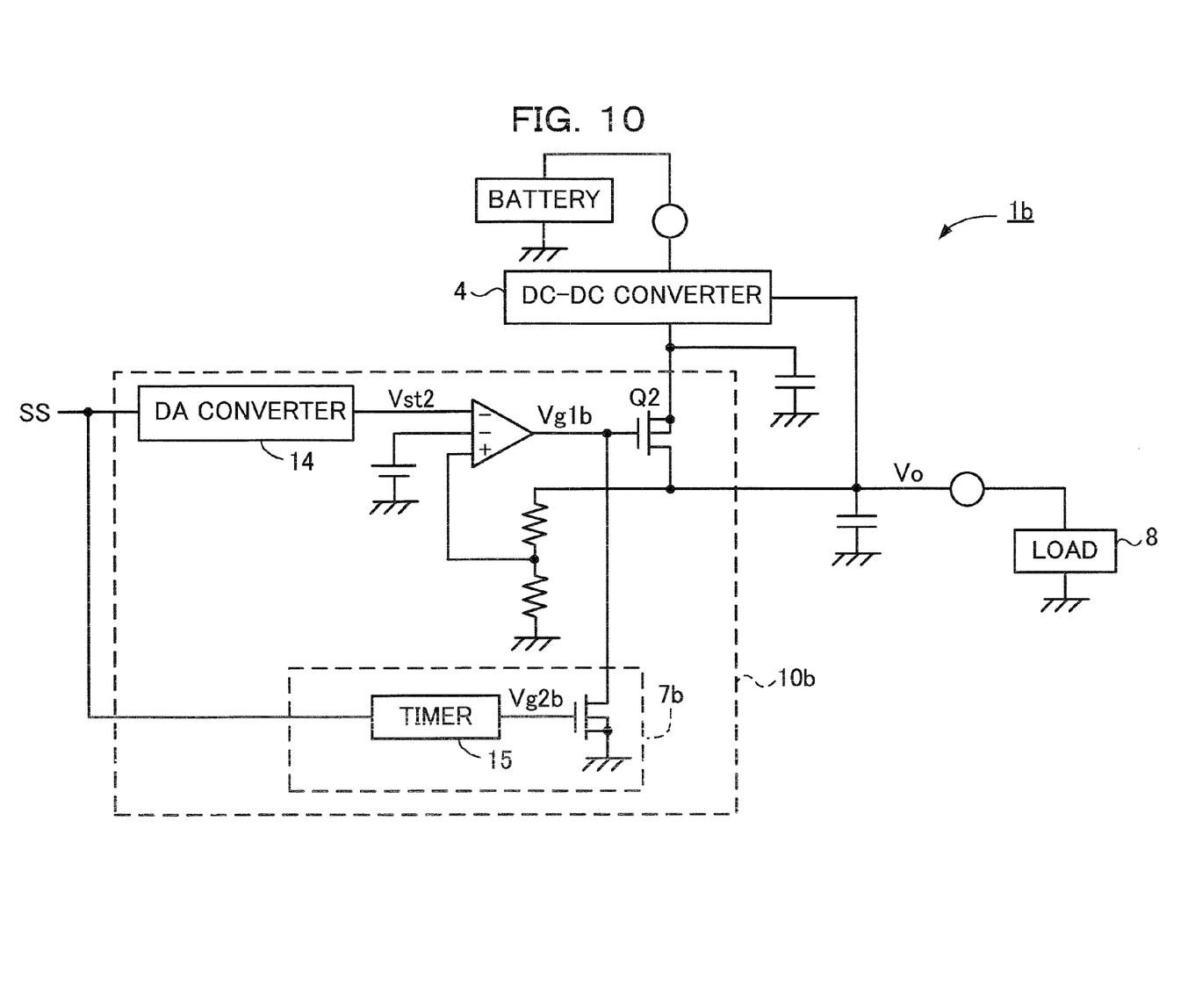
FIG. 10 illustrates a second embodiment.

FIG. 10 illustrates a second embodiment. A power supply control device 1b has an LDO 10b instead of the LDO 10 of the first embodiment in FIG. 3. The LDO 10b has a DA converter 14 instead of the soft start voltage Vst of the power supply control device 1 in FIG. 3. A soft start signal SS is applied to the DA converter 14 from a control circuit (not shown) such as a CPU and a soft start voltage Vst2 is output from the DA converter 14. A logic circuit 7b has a timer 15. Since the other configuration is similar to the configuration of the first embodiment in FIG. 3, detailed description is omitted.

An operation of the power supply control device 1b in FIG. 10 is described. In case that the power supply control device 1b is started, the soft start voltage Vst2 gradually increases, for example, from 0 V according to the soft start signal SS. The on-resistance of the transistor Q2 in FIG. 10 gradually decreases as the soft start voltage Vst2 increases. Because of this, the output voltage Vo gradually increases, for example, from 0 V so that a soft start is performed.

As shown in FIG. 10, the timer 15 starts time measurement in response to starting the soft start. After a certain time set in advance passes, a gate voltage Vg2b output from the timer 15 is inverted from a low level to a high level. Completion of the start up of the power supply control device 1b is detected based on the inversion of the gate voltage Vg2b. The transistor Q2 is kept in the full-on state and the LDO 10b stops a function as a low drop regulator because the high-level gate voltage Vg2 reduces the gate voltage Vg1 to the ground voltage. The above control switches a circuit for controlling the output voltage Vo from the LDO 10b to the DC-DC converter 4 in response to a passage of the certain time.

Various aspects may be applied to a circuit configuration of the timer 15 in FIG. 10. For example, a configuration may be employed in which the soft start signal SS is a pulse signal and the timer 15 in FIG. 10 counts the number of pulses if the soft start voltage Vst2 increases each time the pulse signal is applied. In this case, in case that the counted number of pulses reaches a predetermined count number, the timer 15 in FIG. 10 inverts the gate voltage Vg2b from the low level to the high level. The timer 15 in FIG. 10 may include a clock generator and a clock counter. In this case, the timer 15 in FIG. 10 starts counting the number of clocks with an input of the soft start signal SS being a trigger, and inverts the gate voltage Vg2b from the low level to the high level in case that the counted number of clocks reaches a predetermined count number.

Figure 11:
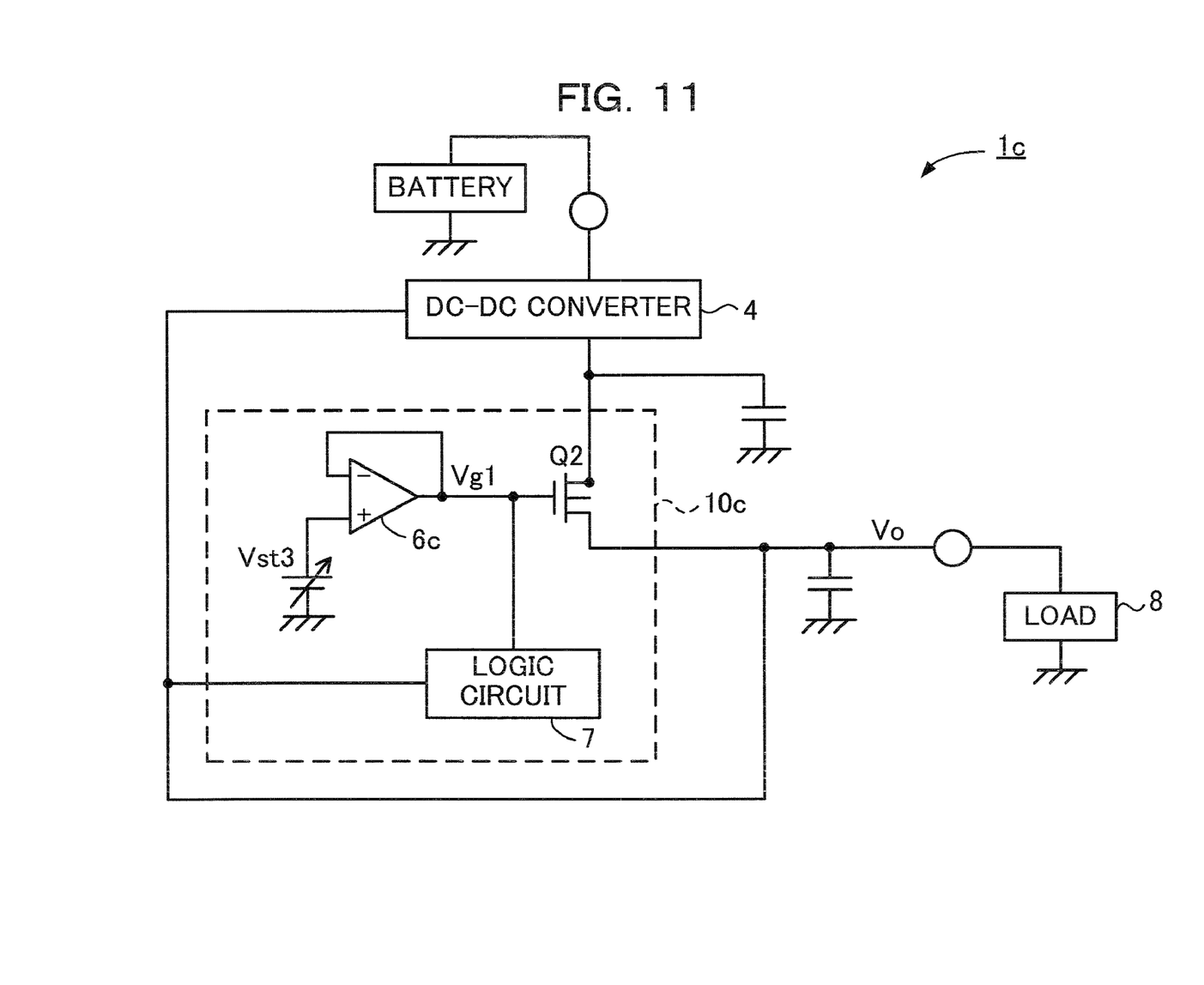
FIG. 11 illustrates a third embodiment.

FIG. 11 illustrates a third embodiment. A power supply control device 1c has an LDO 10c instead of the LDO 10 of the first embodiment in FIG. 3. The LDO 10c has a voltage-follower coupled amplifier 6c. A soft start voltage Vst3 is applied to a non-inversion input of the amplifier 6c. Since the other configuration is similar to the configuration of the first embodiment in FIG. 3, detailed description is omitted.

As shown in FIG. 11, in case that the power supply control device 1c is started, the soft start voltage Vst3 gradually increases, for example, from 0 V. The on-resistance of the transistor Q2 gradually decreases as the soft start voltage Vst3 increases. Because of this, the output voltage Vo gradually increases, for example, from 0 V so that a soft start is performed. In case that the output voltage Vo reaches the set voltage Vset, a passage of the start up period is detected and the gate voltage Vg1 is reduced to the ground voltage by the logic circuit 7. The gate voltage Vg1 is reduced to the ground voltage so that the transistor Q2 is kept the full-on state. As a result, the LDO 10c stops to function as a low drop regulator. The circuit for controlling the output voltage Vo is switched from the LDO 10c to the DC-DC converter 4 in response to the passage of the start up period based on the above control.

As further shown in FIG. 11, since the LDO 10c does not have a feedback loop, a circuit configuration may be further simplified.

In the aforementioned various embodiments, at least the DC-DC converter 4 is an example of a boost type power supply controller, the LDO 10 is an example of a step down power supply controller, the feedback loop FB1 is an example of a first control loop, the feedback loop FB2 is an example of a second control loop, the start up period ST is an example of a predetermined period, and the controller 9 is an example of a controller.

According to the aforementioned various embodiments, the boost type power supply controller boosts an input voltage. The first control loop is formed including the boost type power supply controller. The step down power supply controller reduces an output of the boost type power supply controller to output an output voltage. The second control loop is formed including the step down power supply controller. The output voltage is monitored and controlled by the second control loop during the predetermined period from power on. The output voltage is monitored and regulated to a predetermined set voltage by the first control loop after the predetermined period passes. Because of this, a loop for controlling the output voltage is switched from the second control loop to the first control loop in response to a passage of the predetermined period.

As a comparison, described is the case of using both of the first and second control loops at the time of controlling the output voltage. An input voltage is boosted to a predetermined voltage of a constant value at the first control loop. The voltage boosted to the predetermined voltage is reduced at the second control loop in order to obtain the output voltage that is regulated to a value of the set voltage. In this case, efficiency of the power supply control device decreases because a voltage drop from the predetermined voltage to the output voltage becomes a loss.

According to the aforementioned various embodiments, the second control loop controls the output voltage during the predetermined period from the power on. The second control loop controls the output voltage in any aspect during the predetermined period. For example, the second control loop controls the output voltage so as to gradually raise the output voltage from the power on so that the soft start may be performed.

A switch is performed so that the first control loop controls the output voltage after the predetermined period passes. A voltage drop operation disappears after the predetermined period passes, and therefore, a loss of the voltage drop does not occur. Accordingly, the efficiency of the power supply control device is improved.

According to the aforementioned various embodiments, the power supply control device has the boost type power supply controller for boosting the input voltage, the step down power supply controller for reducing the output of the boost type power supply controller to Output the output voltage, and the controller for controlling a voltage drop amount at the step down power supply controller. After the predetermined period passes from the power on, the controller keeps the voltage drop amount and the boost type power supply controller boosts the input voltage based on the output voltage.

The boost type power supply controller boosts the input voltage. The step down power supply controller reduces the output of the boost type power supply controller to output the output voltage. The controller controls the voltage drop amount at the step down power supply controller. The controller controls the voltage drop amount during the predetermined period from the power on. After the predetermined time passes, the controller stops the control of the voltage drop amount at the step down power supply controller for keeping the voltage drop amount. Then, the boost type power supply controller boosts the input voltage based on the output voltage. As a result, the circuit for controlling the output voltage is switched from the step down power supply controller to the boost type power supply controller in response to the passage of the predetermined period.

As a comparison, described is the case of using both of the boost type and step down power supply controllers at the time of controlling the output voltage. The boost type power supply controller boosts the input voltage to the predetermined voltage of a constant value. The step down power supply controller reduces the voltage boosted to the predetermined voltage and obtains the output voltage regulated to a value of the set voltage. In this case, the efficiency of the power supply control device decreases because the voltage drop from the predetermined voltage to the output voltage becomes a loss.

According to the aforementioned various embodiments, the step down power supply controller controls the output voltage during the predetermined period from the power on. The step down power supply controller controls the output voltage in any aspect during the predetermined period. For example, the step down power supply controller controls the output voltage so as to gradually raise the output voltage from the power on so that the soft start may be performed.

A switch is performed so that the boost type power supply controller controls the output voltage after the predetermined period passes. A voltage drop operation disappears after the predetermined period passes, and therefore, a loss of the voltage drop does not occur. Accordingly, the efficiency of the power supply control device is improved.

According to the aforementioned embodiment(s), power consumption in power supply is reduced.

Numbers applying embodiments (first, second or third etc.) do not show priorities of the embodiments. Many variations and modifications will be apparent to those skilled in the art.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A power supply control device comprising:
   a boost type power supply controller boosting an input voltage;
   a step down power supply controller reducing an output of the boost type power supply controller to output an output voltage;
   a first control loop including the boost type power supply controller and monitoring the output voltage; and
   a second control loop including the step down power supply controller,
   wherein the output voltage is controlled by the second control loop during a predetermined period beginning after the power supply control device enters a power-on state, and wherein the output voltage is controlled by the first control loop after the predetermined period passes,
   wherein the second control loop includes a switch which becomes a connection state when generating the second control loop and is controlled based on a comparison result between a start voltage and the output voltage feed-backed by the second control loop.

2. The power supply control device according to claim 1, wherein the second control loop controls the output voltage with soft-start control during the predetermined period, and stops the control of the output voltage after the predetermined period passes.

3. The power supply control device according to claim 1, wherein the step down power supply controller is a circuit controlling the output voltage by controlling an on-resistance value of a transistor that receives the output of the boost type power supply controller, and wherein a value of a voltage output from the boost type power supply controller is obtained by adding a value of a voltage drop at the transistor to a value equal to or greater than the output voltage.

4. The power supply control device according to claim 1, wherein the predetermined period is a period during which the output voltage controlled by the second control loop reaches a predetermined voltage.

5. The power supply control device according to claim 1, wherein the predetermined period is measured from the power-on state.

6. The power supply control device according to claim 1, wherein the boost type power supply controller boosts the input voltage based on the output voltage after a predetermined period beginning from a time the power supply control device enters a power-on state.

7. The power supply control device according to claim 6, wherein the controller reduces the voltage drop amount during the predetermined period, and maintains the voltage drop amount at a minimum value of the reduced voltage drop amount after the predetermined period passes.

8. The power supply control device according to claim 6, wherein the step down power supply controller is a circuit controlling the output voltage by controlling an on-resistance of a transistor that receives the output of the boost type power supply controller, and wherein a value of a voltage output from the boost type power supply controller is obtained by adding a value of a voltage drop at the transistor to a value equal to or greater than the output voltage.

9. The power supply control device according to claim 6, wherein the predetermined period is a period during which the output voltage controlled by the second control loop reaches a predetermined voltage.

10. The power supply control device according to claim 6, wherein the predetermined period is measured from the power-on state.

11. A power supply control method comprising:
controlling an output voltage with a second control loop having a step down power supply controller;
reducing an output of a boost type power supply controller via the step down power supply controller;
boosting an input voltage via the boost type power supply controller;
outputting the output voltage with a second control loop during a predetermined period beginning at a time a power-on state is entered; and
controlling the output voltage with a first control loop having the boost type power supply controller after the predetermined period passes,
wherein the second control loop includes a switch which becomes a connection state when generating the second control loop and is controlled based on a comparison result between a start voltage and the output voltage feed-backed by the second control loop.

* * * * *